July 18, 1967     P. F. BERRY     3,331,625
CARRIER
Filed Sept. 13, 1965
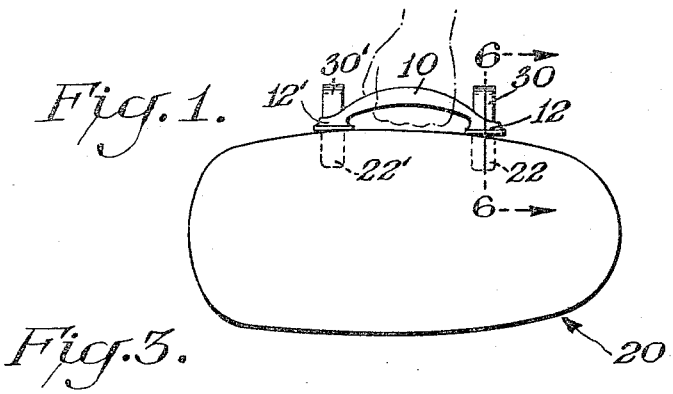
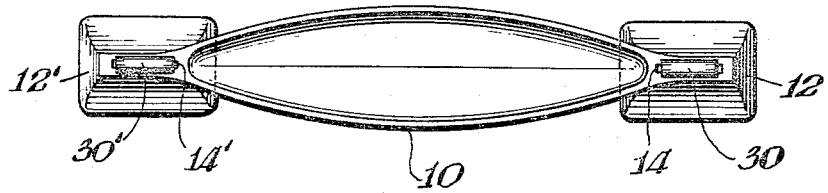
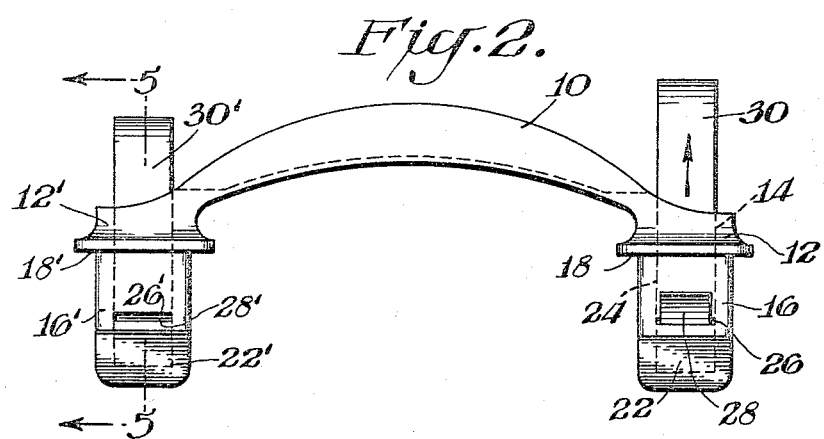
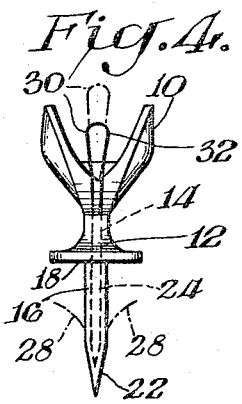
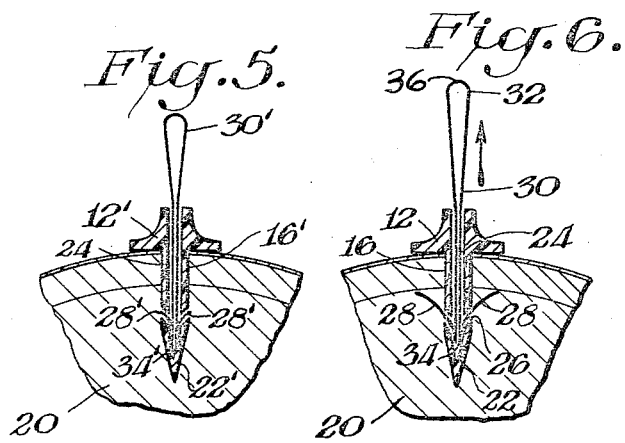
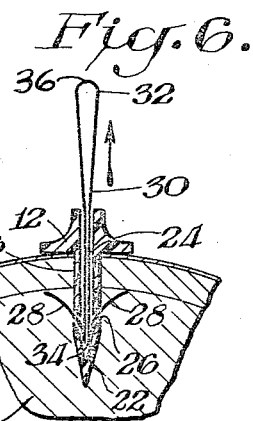
INVENTOR
Paul F. Berry
BY Connolly and Hutz
ATTORNEYS

United States Patent Office 3,331,625
Patented July 18, 1967

3,331,625
CARRIER
Paul F. Berry, 4 Walnut Ridge Road,
Wilmington, Del. 19807
Filed Sept. 13, 1965, Ser. No. 486,677
10 Claims. (Cl. 294—15)

This invention relates to a handle for transporting bulky fruit and vegetables, and it more particularly relates to such a handle for carrying watermelons and the like.

The lack of a convenient carrying device for bulky fruits and vegetables such as watermelons is frequently a detriment to the sale of these items. Although generally attractive to prospective purchasers because of their savory appeal, the demand for watermelons is adversely affected by their bulky nature. All bulky fruits and vegetables are cumbersome making them extremely difficult to take home from the retail shops, especially when bundles and other packages must also be carried. Without an economical and easy to operate device for transporting them, the market for such items will remain low in comparison to other less bulky fruits and vegetables.

Accordingly, an object of this invention is to provide a simple, dependable, reusable, economical and easy to operate device for carrying watermelons and other types of bulky fruits and vegetables.

In accordance with this invention, a device for carrying watermelons and other types of bulky fruit and vegetables includes a handle portion for grasping the device and penetrating fingers connected to the handle for insertion into a watermelon. The fingers are provided with a free tapered end for piercing the watermelon rind and a longitudinal channel which extends inside the finger from an opening adjacent the handle portion to a blind end near the free end of the finger. Transverse slots in the finger connect the longitudinal channel to the exterior of the finger. Retractable barbs in the finger secure the device to the watermelon after the fingers are inserted. The barbs are movable in the channel between a retracted position in which they are disposed essentially within the channel so as not to interfere with the insertion of the finger into the watermelon, and an extended position in which they project from the channel through the slots into the interior of the watermelon. An actuator having a portion extending from the channel near the handle is connected to the barbs for the purpose of lifting them through the slots into extended position.

Novel features and advantages of the present invention will become apparent to one skilled in the art from the following description in conjunction with the accompanying drawings wherein similar reference characters refer to similar parts and in which:

FIG. 1 is a view in elevation of an embodiment of this invention secured to a watermelon;

FIG. 2 is a front elevation of an embodiment of the present invention;

FIG. 3 is a plan view of the embodiment shown in FIG. 2;

FIG. 4 is an end elevation of the embodiment shown in FIGS. 2 and 3;

FIG. 5 is a cross-sectional view of the device of FIGS. 1–4 taken along line 5—5, showing the device inserted into a watermelon; and FIG. 6 is a corresponding cross-sectional view taken along line 6—6 of FIG. 1.

Referring more particularly to the drawings, the device of FIGS. 1–4 comprises a curved handle 10 including a terminal flange portion 12 having a passageway 14. A flat penetrating finger 16 connected at its upper end 18 to flange portion 12 depends downwardly from handle 10 for insertion into watermelon 20. Finger 16 includes a lower tapered free end 22 for piercing watermelon 20 and an interior longitudinal channel 24. Channel 24 forms a continuation of passageway 14 in flange portion 12 and extends from the upper end 18 of the finger 16 to a point above lower free end 22. Finger 16 also includes external transverse slots 26 inclined to channel 24 toward flange portion 12. Slots 26 communicate with channel 24 at a point above the lower end of the channel to connect the channel to the exterior of the finger.

Finger 16 is provided with retractable barbs 28 for securing the finger to watermelon 20 after it is inserted therein. Barbs 28 move between a retracted position, as shown in FIG. 5, and an extended position, as shown in FIG. 6. In the retracted position, the major portions of barbs 28 are within channel 24 and the outer tips extend slightly into slots 26. In this position the barbs do not interfere when the finger is inserted into the watermelon. When moved to the extended position barbs 28 project from the finger through slots 26 into watermelon 20 to effectively secure finger 16 to the watermelon. An actuator 30 including grip element 32 is connected to barbs 28 at fold lines 34 to move the barbs to the retracted and extended positions. Actuator 30 extends from outside finger 16 through passageway 14 and into channel 26. In the retracted position the major portions of barbs 28 lie substantially parallel to actuator 30 and in the extended position barbs 28 are inclined to the actuator at an inclination substantially equal to the incline of slots 26 with respect to channel 24.

A second finger 16' is connected to flange 12' at the other end of handle 10. Since finger 16' can be an exact duplicate of finger 16, a detailed description is omitted.

Actuator 30 and barbs 28 may be constructed from a single strip of stiff but somewhat flexible sheet material, such as a strip of polyethylene filled with longitudinally extending rayon fibers. The strip is simply folded in half at 36 to form actuator 30 and the terminal portions of the strip are folded at lines 34 to form barbs 28. Heat may be applied to fold lines 34 to permanently set barbs 28 at an incline to actuator 30 to thereby bias barbs 28 toward the inclined position in which they pass through the slots 26. The stiffness of barbs 28 enables them to project into the interior of a watermelon and prevents them from being pulled out of channel 24 by an excessive upward force on actuator 30. However, the barbs are sufficiently yieldable to flex outwardly through slots 26 when actuator 30 is pulled upwardly. The barbs can also be made of other plastics with or without fibers or other types of fillers, and can be made of metal such as stainless steel or the like.

Handle 10 and fingers 16, 16' may be molded as a single unit from a suitable plastic material such as polystyrene or polyethylene or carved out of wood. It may alternatively be molded or carved in halves defined by cutting longitudinally through the channels in the fingers, and the molded halves cemented together. The distance between slots 26 and the bottom of channel 24 may be slightly greater than the length of barbs 28. Actuator 30 and barbs 28 could then be inserted into passageway 14 to the bottom of channel 24 so that the outer tips of barbs 30 will be slightly below slots 26. This is particularly suitable for handles molded in one piece. When actuator 30 is pulled barbs 30 are biased into slots 26 by their tendency to at least partially unfold, and they thus pass outwardly from the finger into the interior of the watermelon in which the finger is inserted, to secure the finger thereto.

When barbs 28 are in the extended position, their outer tips are spaced from flange portion 14 by a distance of about 0.6 inch which is approximately equal to the thickness of a watermelon rind. With such an arrangement, the tips engage the underside of the rind when the fingers are inserted into a melon and the barbs are extended, to thereby effectively secure the finger to the watermelon. Barbs 28 are easily projected into the pulpy interior of the watermelon until they engage the rind. The rind, being more dense than the pulpy interior, is effectively locked against the barb, so that finger 16 can not be withdrawn from the melon until the barbs are retracted.

Operation

When securing the device of the present invention to a watermelon, the barbs are retracted. Handle 10 is grasped by one hand to forcefully insert fingers 16, 16' into watermelon 20 until flange portions 14, 14' engage the rind. Actuators 30, 30' are then pulled upwardly to move barbs 28, 28' to the extended position to thereby secure the fingers to the watermelon. In the extended position barbs 28, 28' project outwardly from finger 16, 16' through slots 26, 26' into the interior of the watermelon in which the fingers are inserted. The watermelon can then be conveniently carried by simply holding handle 10. In order to remove the device, actuators 30, 30' are pushed downwardly to retract barbs 28, 28' and handle 10 then pulled upwardly to withdraw the device from the watermelon.

Although the present invention has been shown in connection with certain specific embodiments, it will be readily apparent to those skilled in the art that various changes in form and arrangement of parts may be made to suit requirements without departing from the spirit of the invention. Thus, while the fingers have been shown as of flattened configuration, lying essentially in a common plane, the fingers can be oriented with their individual planes extending in different directions, as for example at right angles to the position they occupy in the drawings.

What is claimed is:

1. A device for carrying bulky melons comprising an elongated handle portion for grasping the device, flat penetrating finger means extending from the respective ends of said handle portion for insertion into a melon, barb means in each of said finger means movable between a retracted position in which the barb means does not interfere with the insertion of the finger means into a melon, and an extended position in which the barb means projects outwardly from the finger means and into the interior of a melon in which the finger means is inserted for securing the device to a melon, and actuator means connected to extend said barb means.

2. A device for carrying bulky melons comprising an elongated handle portion for grasping the device, flat penetrating finger means connected to the respective ends of said handle portion for insertion into a melon, each of said finger means having an interior longitudinal channel and transverse slots communicating with said channel to connect the channel with the exterior of said finger means, barb means in said finger means movable between a retracted position in which said barb means is within said channel and an extended position in which said barb means projects from said channel through said slots for securing the device to a melon, and actuator means connected to retract and extend said barb means.

3. A device for carrying melons as set forth in claim 2 wherein said finger means includes a tapered free end for piercing a melon rind.

4. A device for carrying melons as set forth in claim 3 wherein said transverse slots are spaced from the free ends of said finger means, and are inclined outwardly away from said ends.

5. A device for carrying melons as set forth in claim 2 wherein said actuator includes a grip element integral with the barb means and projecting from said longitudinal channel near said handle portion.

6. A device for carrying bulky melons comprising a flat handle portion for grasping the device, flat penetrating finger means connected to said handle portion for insertion into a melon, said finger means having an interior longitudinal channel and transverse slots communicating with said channel to connect the channel with the exterior of said finger means, barb means in said finger means movable between a retracted position in which said barb means is within said channel and an extended position in which said barb means projects from said channel through said slots for securing the device to a melon, and actuator means connected to retract and extend said barb means, said barb means and said actuator means being integral portions of a strip creased to hold the barb means inclined with respect to said actuator means.

7. A device for carrying melons as set forth in claim 5 wherein said barb means and said actuator means are constructed of stiff sheet material.

8. A device for carrying bulky melons comprising a curved handle portion for grasping the device, flat penetrating finger means connected to each end of said handle portion for insertion into a melon, each of said finger means having an interior longitudinal channel and transverse slots communicating with said channel to connect the channel to the exterior of said finger means, barb means in each of said finger means movable between a retracted position in which the barbs are substantially entirely within the finger means for simplifying the insertion of the finger means into a melon, and an extended position in which the barb means project outwardly from the finger means through the transverse slots and into the interior of a melon in which the finger means is inserted for securing the device to a melon, and actuator means connected to extend said barb means.

9. A device for carrying bulky melons comprising a handle portion for grasping the device, flat penetrating finger means extending from said handle portion for insertion through the rind of a melon to be carried, the finger means having an abutment flange that limits the penetration of the finger means into the melon, the finger means also including a longitudinal passageway in which a slidable actuator band is received for movement between a retracted position and an extended position, the outer end of the actuator band projecting from the passageway and providing a grip portion by which the actuator can be pulled to the extended position, and the inner portion of the actuator carrying barb means connected to move out laterally of the finger means when the actuator sheet is extended, the barb means being at a single level and the parts being dimensioned so that the outer limit of the barb means in extended position is spaced from the flange by about the thickness of the rind of the melon to be carried.

10. A device for carrying melons as set forth in claim 9, in which spacing between the flange and the outer limit of the extended barb means is about 0.6 inch.

References Cited

UNITED STATES PATENTS 524,035   8/1894   White _____ 294—61 X
882,808   3/1908   Woodward _____ 224—56

GERALD M. FORLENZA, Primary Examiner.

HUGO O. SCHULZ, Examiner.

G. F. ABRAHAM, Assistant Examiner.